United States Patent
Kitagawa et al.

(10) Patent No.: US 9,914,259 B2
(45) Date of Patent: Mar. 13, 2018

(54) METHOD FOR PRODUCING FILLER-CONTAINING FLUORORESIN SHEET

(71) Applicant: NITTO DENKO CORPORATION, Ibaraki-shi, Osaka (JP)

(72) Inventors: Daisuke Kitagawa, Osaka (JP); Kenichi Tagawa, Osaka (JP); Kimiaki Tauchi, Osaka (JP); Yoshinari Takayama, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 225 days.

(21) Appl. No.: 14/917,749

(22) PCT Filed: Sep. 11, 2014

(86) PCT No.: PCT/JP2014/004721
§ 371 (c)(1),
(2) Date: Mar. 9, 2016

(87) PCT Pub. No.: WO2015/037245
PCT Pub. Date: Mar. 19, 2015

(65) Prior Publication Data
US 2016/0214311 A1    Jul. 28, 2016

(30) Foreign Application Priority Data
Sep. 12, 2013 (JP) ................. 2013-189520

(51) Int. Cl.
*B29C 55/18* (2006.01)
*B29C 43/22* (2006.01)
(Continued)

(52) U.S. Cl.
CPC .............. *B29C 55/18* (2013.01); *B29C 43/22* (2013.01); *B29C 53/60* (2013.01);
(Continued)

(58) Field of Classification Search
CPC ......... A21C 3/022; B29C 55/18; B29C 43/22; B29C 53/60
See application file for complete search history.

(56) References Cited

U.S. PATENT DOCUMENTS 1,658,860 A * 2/1928 Schorsch ............... D01H 15/42
19/163
1,868,317 A * 7/1932 Green ..................... A21C 3/022
425/337
(Continued)

FOREIGN PATENT DOCUMENTS

EP     1900949 A2      3/2008
GB      686374 A  *  1/1953 ............. B29C 43/22
(Continued)

OTHER PUBLICATIONS

Extended European Search Report for corresponding European Patent Application No. 14844712.1, dated Apr. 18, 2017, 5 pages.

*Primary Examiner* — Timothy Kennedy
(74) *Attorney, Agent, or Firm* — Hamre, Schumann, Mueller & Larson, P.C.

(57) ABSTRACT

A disclosed method for producing an elongated filler-containing fluororesin sheet includes: a step (I) of forming a strip member from a strip sheet containing a fluororesin, a filler, and a forming aid; and a step (II) of forming an elongated sheet strip by rolling the strip member in a longitudinal direction of the strip member. In the step (I), the strip member is formed by bending the strip sheet in such a manner that quadrilaterals formed on a surface of the strip member, each defined by two strip member side edges extending in the longitudinal direction of the strip member and two strip sheet side edges of the strip sheet that crosses a region between the two strip member side edges are parallelograms each having an acute angle α as an interior (Continued)

angle and that the parallelograms are arranged in the longitudinal direction of the strip member.

14 Claims, 5 Drawing Sheets

(51) Int. Cl.
*B29C 53/60* (2006.01)
*B29K 27/12* (2006.01)
*B29K 105/16* (2006.01)
*B29K 27/18* (2006.01)
*B29K 105/00* (2006.01)
*B29K 507/04* (2006.01)

(52) U.S. Cl.
CPC ...... *B29K 2027/12* (2013.01); *B29K 2027/18* (2013.01); *B29K 2105/16* (2013.01); *B29K 2105/256* (2013.01); *B29K 2507/04* (2013.01); *B29K 2995/0005* (2013.01); *B29K 2995/0013* (2013.01); *B29K 2995/0044* (2013.01)

(56) References Cited

U.S. PATENT DOCUMENTS

| | | | | |
|---|---|---|---|---|
| 2,076,657 | A * | 4/1937 | Loose | A21C 3/022 425/391 |
| 2,381,184 | A * | 8/1945 | Ripley | D04H 1/74 28/107 |
| 2,588,725 | A * | 3/1952 | Hogan | D01G 25/00 156/474 |
| 3,523,059 | A * | 8/1970 | Coates | D02G 3/06 156/148 |
| 3,740,282 | A * | 6/1973 | Watson | D04H 1/74 156/148 |
| 3,804,637 | A * | 4/1974 | Rejsa | A21C 3/00 226/113 |
| 3,933,550 | A * | 1/1976 | Erwin | B29C 66/001 156/85 |
| 4,081,305 | A * | 3/1978 | Patin | B54H 45/20 156/181 |
| 4,361,619 | A * | 11/1982 | Forsten | B01D 39/1623 210/505 |
| 5,606,906 | A * | 3/1997 | Finkowski | A21C 3/022 425/321 |
| 5,981,411 | A * | 11/1999 | Brown | A43B 23/17 428/373 |
| 6,016,848 | A * | 1/2000 | Egres, Jr. | F16L 9/12 138/109 |
| 7,846,238 | B2 | 12/2010 | Suzuki et al. | |
| 2008/0240634 | A1 | 10/2008 | Laal Riahi et al. | |

FOREIGN PATENT DOCUMENTS

| | | |
|---|---|---|
| JP | 59-196224 | 11/1984 |
| JP | 8-132521 | 5/1996 |
| JP | 2002-370279 | 12/2002 |
| JP | 2007-260547 | 10/2007 |
| JP | 2009-197147 | 9/2009 |
| JP | 2010-180070 | 8/2010 |
| WO | 9919592 A1 | 4/1999 |

* cited by examiner

METHOD FOR PRODUCING FILLER-CONTAINING FLUORORESIN SHEET

TECHNICAL FIELD

The present invention relates to a method for producing a filler-containing fluororesin sheet.

BACKGROUND ART

Fluororesins such as polytetrafluoroethylene (hereinafter referred to as "PTFE") are excellent in properties such as heat resistance, light resistance, chemical resistance, electrical insulation, and slidability. Fillers are often added to fluororesins to improve their properties such as wear resistance, electrical conductivity, and thermal conductivity.

Generally, elongated fluororesin sheets are mass-produced by forming a mixture containing a fluororesin and a forming aid into strip sheets by extrusion molding or the like and then rolling the sheets in their longitudinal direction to a desired thickness. Filler-containing fluororesin sheets also can be obtained by forming a mixture containing a fluororesin, a filler, and a forming aid into sheets and then rolling the sheets. However, the resulting fluororesin sheets may have lower strength due to the filler, which is a solid additive.

Patent Literature 1 discloses a PTFE sheet production method suitable for improving the strength of the sheet. In the production method disclosed in Patent Literature 1, a PTFE sheet is produced by forming a mixture containing a fluororesin, a pore-forming material, and a forming aid into sheets, stacking the sheets to form a stack, and then applying pressure to the stack in its thickness direction to compress it. The pore-forming material is added to form pores but is removed from the resulting PTFE sheet. In Examples of Patent Literature 1, the stack is compressed in a press.

CITATION LIST

Patent Literature

Patent Literature 1: JP 2009-197147 A

SUMMARY OF INVENTION

Technical Problem

The technique disclosed in Patent Literature 1 is suitable for joining the layers of the stack together to increase the strength of the fluororesin sheet. However, a fluororesin sheet obtained by rolling, which is a pressing process more suitable for mass production than a pressing process using a batch-type press, has lower strength in its transverse direction than in its longitudinal direction as its rolling direction perpendicular to the transverse direction. Therefore, the filler-containing fluororesin sheet obtained by rolling may lack sufficient strength in its transverse direction. Particularly for a filler-containing fluororesin sheet, it is desirable to reduce the directional dependence of the strength.

It is, therefore, an object of the present invention to provide a method suitable for efficiently producing an elongated filler-containing fluororesin sheet having a small difference between its longitudinal and transverse strengths.

Solution to Problem

The present invention provides a method for producing a filler-containing fluororesin sheet, including: a step (I) of forming a strip member from a strip sheet containing a fluororesin, a filler, and a forming aid; and a step (II) of forming an elongated sheet strip by rolling the strip member in a longitudinal direction of the strip member. In this method, in the step (I), the strip member is formed by bending the strip sheet in such a manner that quadrilaterals formed on a surface of the strip member, each defined by two strip member side edges extending in the longitudinal direction of the strip member and two strip sheet side edges of the strip sheet that crosses a region between the two strip member side edges are parallelograms each having an acute angle α as an interior angle and that the parallelograms are arranged in the longitudinal direction of the strip member.

Advantageous Effects of Invention

According to the present invention, it is possible to efficiently produce an elongated filler-containing fluororesin sheet having a small difference between its longitudinal and transverse strengths.

DESCRIPTION OF EMBODIMENTS

Figure 1:
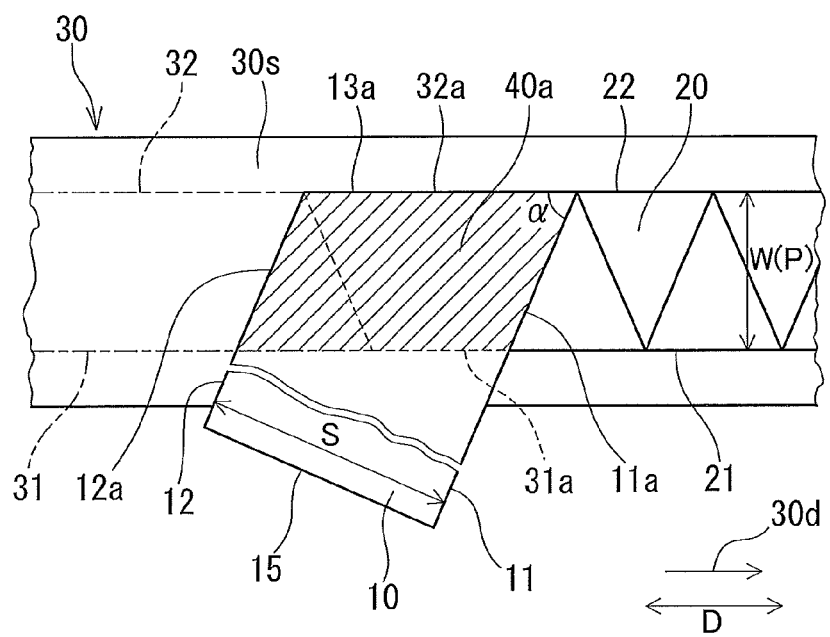
FIG. 1 is a plan view of a strip member showing a step of an embodiment of a step (Ia).

Hereinafter, preferred embodiments of the present invention will be described. The present invention is not intended to be limited to the embodiments described below.

The production method of the present invention includes: a step (I) of forming a strip member from a strip sheet containing a fluororesin, a filler, and a forming aid; and a step(II) of forming an elongated sheet strip by rolling the strip member in a longitudinal direction of the strip member. These steps are described below, respectively.

[Step (I)]

(Strip Sheet)

The strip sheet contains a fluororesin, a filler, and a forming aid. This sheet may consist of the fluororesin, the filler, and the forming aid, and may further contain a material other than these materials.

Preferably, the fluororesin. contains PTFE. The fluororesin may consist of PTFE, or may be a mixture of PTFE and another fluororesin. The content of PTFE in the fluororesin is suitably 5 wt. % or more, and particularly suitably 10 wt. % or more. Preferably, another fluororesin to be mixed with PTFE has a melting point of 250° C. or higher. Examples of another fluororesin to be mixed with PTFE include melt-processable fluororesins having good compatibility with PTFE, such as tetrafluoroethylene-perfluoroalkyl vinyl ether copolymer (PFA), tetrafluoroethylene-hexafluoropropyrene copolymer (FEP). The addition of such a melt-processable fluororesin leads to a decrease in the porosity, which may result in a significant improvement in the properties brought about by the filler.

The filler can be selected as appropriate depending on its intended use and application. A preferred filler is a non-organic compound, specifically, an inorganic compound, or a metal or non-metal elementary substance. The preferred filler is preferably a material that does not decompose at a sintering temperature of the fluororesin, more specifically at a preferred sintering temperature of PTFE (about 370° C. to 390° C.). Examples of the filler capable of enhancing the electrical insulation include silica, alumina, magnesia, titania, zirconia, aluminum nitride, and boron nitride. Examples of the filler capable of enhancing the electrical conductivity include carbon materials and various metals. Examples of the filler capable of enhancing the heat dissipation include the filler materials from silica to various metals listed above as materials capable of enhancing the electrical insulation and electrical conductivity.

The materials listed above may be used alone, or two or more of them may be used in combination. The shape of the filler is not particularly limited, and a shape suitable for its intended application can be selected. For example, the addition of aggregates of flaky boron nitride significantly enhances the thermal conductivity of the fluororesin sheet. In this respect, the boron nitride particles are preferably flaky in shape, but the shape of boron nitride particles is not limited to the flaky shape. Other examples of the preferred filler are carbon materials such as graphite, carbon black, and carbon fiber, and carbon black is particularly preferred. The filler may contain at least one selected from the group consisting of carbon black and boron nitride. The content of carbon black and/or boron nitride in the filler may be 90 wt. % or more.

The filler is usually added in the form of particles. The size of the particles is not particularly limited, and it can be selected as appropriate depending on the type of the filler and the purpose of adding it. It is generally recommended to select a filler having an average particle diameter of 5 nm to 300 μm. The average particle diameter of flaky boron nitride is preferably 1 to 10 μm. The average particle diameter of aggregates of flaky boron nitride is preferably 90 to 200 μm. The average particle diameter of the carbon materials such as carbon black is preferably 10 to 100 nm.

The amount of the filler to be added is preferably in a range of 10 to 90 wt. %, more preferably in a range of 40 to 90 wt. %, and particularly preferably in a range of 40 to 75 wt. %, relative to the total weight of the sheet excluding the forming aid, typically the total amount of the fluororesin and the filler.

Any known organic solvent suffices as the forming aid if it is suitable for the fluororesin used. Typical examples of the forming aid suitable for PTFE include naphtha and petroleum-based hydrocarbon. A single type or multiple types of saturated hydrocarbons may be used as the forming aid. The amount of the forming aid to be added is preferably in a range of 15 to 60 wt. %, and particularly preferably in a range of 20 to 55 wt. %, relative to the total weight of the sheet.

(Specific Embodiment of Step (I))

For example, the step (I) can be performed as a step (Ia) or a step (Ib) described below.

The step (Ia) is a step of folding the strip sheet back and forth in an overlapping manner on a support surface of a support member so that the side edges of the strip sheet form a pattern of a continuous W shape (i.e., a zigzag pattern).

For example, the step (Ia) can be carried out in the following manner.

Specifically, the step (Ia) includes: folding the strip sheet back along a first imaginary line toward a second imaginary line, the first imaginary line and the second imaginary line extending in parallel on a support surface in a longitudinal direction D of the strip member to be formed, the strip sheet being placed on the support surface so that, as seen in a direction perpendicular to the support surface, the strip sheet side edges diagonally cross a region between the first imaginary line and the second imaginary line, wherein the strip sheet is folded back so that, as seen in the direction perpendicular to the support surface, the strip sheet side edges of an unfolded portion of the strip sheet diagonally cross the region between the first and second imaginary lines; and a step (Ia2) of folding the strip sheet already folded along the first imaginary line back toward the first imaginary line along the second imaginary line so that, as seen in the direction perpendicular to the support surface, the strip sheet side edges of an unfolded portion of the strip sheet diagonally cross the region between the first and second imaginary lines. The step (Ia1) and the step (Ia2) are repeated alternately so as to form the strip member on the support surface.

The step (Ib) is a step of spirally winding the strip sheet around a core member and then removing the core member.

For example, the step (Ib) can be carried out in the following manner.

Specifically, the step (Ib) includes: a step (Ib1) of spirally winding the strip sheet around a core member extending in the longitudinal direction D of the strip member to be formed so as to obtain a roll of the strip sheet; and a step (Ib2) of removing the core member from the roll so as to obtain the strip member.

(Step (Ia))

An example of the step (Ia) is described with reference to FIG. 1 to FIG. 5. FIG. 1 to FIG. 5 are views of a strip member 20 supported on a support surface 30s, as seen from above in a direction perpendicular to the support surface 30s.

A support member 30 has the support surface 30s extending in the longitudinal direction D of the strip member 20 to be formed. The support surface 30s has two imaginary lines 31 and 32 extending in parallel in the longitudinal direction D. A region between the imaginary lines 31 and 32 spaced apart from each other by a distance P is used to form the strip member 20 thereon by folding a sheet 10 having a width S back and forth in an overlapping manner. The sheet 10 is continuously fed onto the region from above the support surface 30s (in a direction perpendicular to the figure plane), along the longitudinal direction of the sheet. The fed sheet 10 is sequentially folded back and forth in an overlapping manner to form the strip member 20 having a width W equal to the width P.

As shown in FIG. 1, a portion of the sheet 10 on the right side of its folding line 13a in the figure is already folded along the first imaginary line 31 and the second imaginary line 32 alternately so as to form the strip member 20. The folding lines including the folding line 13a are formed along the first imaginary line 31 and the second imaginary line 32, while the strip member 20 is formed as a long member with its side edges 21 and 22 extending along the imaginary lines 31 and 32 respectively. The sheet 10 is folded to form valley folds as seen from above in the direction perpendicular to the figure plane. This type of folding is herein referred to as "folding back". In the state shown in FIG. 1, the sheet 10 has already been folded back toward the second imaginary line 32 along a folding line on the first imaginary line 31 and has just been folded back along the folding line 13*a* on the second imaginary line 32.

The sheet side edges 11 and 12 of a portion of the sheet 10 fed forward from the folding line 13*a*, in other words, an unfolded portion of the sheet 10 to be subsequently folded back (i.e., a portion of the sheet 10 closer to its end edge 15), diagonally cross the region between the imaginary lines 31 and 32, specifically, to form an acute angle α with the longitudinal direction D. A quadrilateral defined by the sheet side edges 11 and 12 and the imaginary lines 31 and 32, more specifically, a quadrilateral (a hatched region) defined by four sides, i.e., sheet side edges 11*a* and 12*a* between the imaginary lines 31 and 32 and imaginary lines 31*a* and 32*a* between the sheet side edges 11 and 12, forms a parallelogram 40*a* having an acute angle α as an interior angle.

Figure 2:
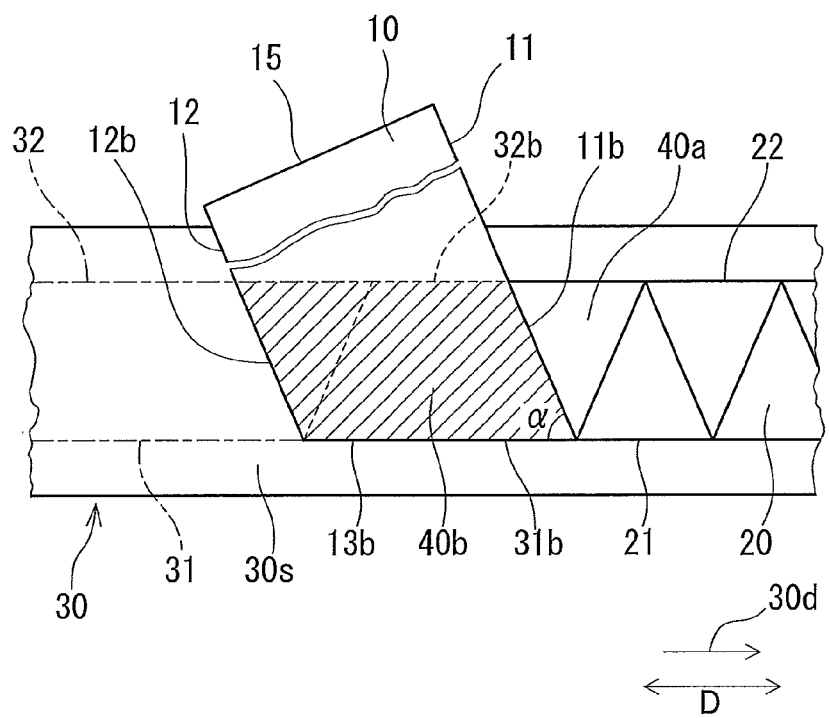
FIG. 2 is a plan view of the strip member showing a step subsequent to the step shown in FIG. 1.

Next, as shown in FIG. 2, the sheet 10 folded along the folding line 13*a* is folded back toward the second imaginary line 32 along a folding line 13*b* on the first imaginary line 31 of a portion of the sheet 10 fed forward (i.e., a portion of the sheet closer to the end edge 15) so that the sheet side edges 11 and 12 of an unfolded portion of the sheet 10 diagonally cross the region between the imaginary lines 31 and 32 to form an acute angle α with the longitudinal direction D. A quadrilateral defined by four sides, i.e., sheet side edges 11*b* and 12*b* between the imaginary lines 31 and 32 and imaginary lines 31*b* and 32*b* between the sheet side edges 11 and 12 forms a parallelogram 40*b* having an acute angle α as an interior angle.

Figure 3:
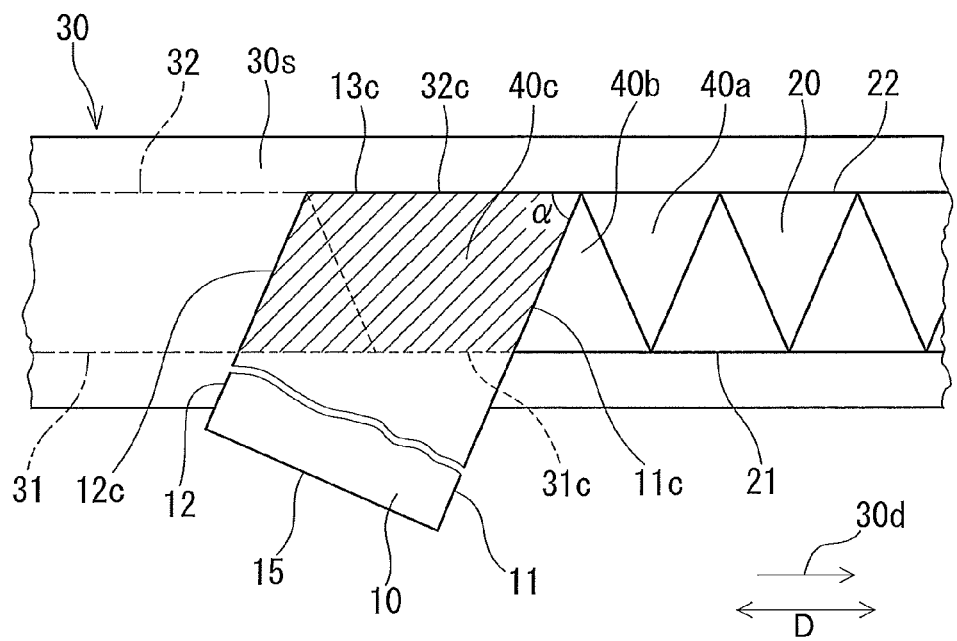
FIG. 3 is a plan view of the strip member showing a step subsequent to the step shown in FIG. 2.

Subsequently, as shown in FIG. 3, the sheet 10 folded again along the folding line 13*b* is folded back toward the first imaginary line 31 along a folding line 13*c* of a portion of the sheet 10 fed forward from the folding line 13*b* so that the sheet side edges 11 and 12 of an unfolded portion of the sheet 10 diagonally cross the region between the imaginary lines 31 and 32 to form an acute angle α with the longitudinal direction D. A quadrilateral defined by four sides, i.e., sheet side edges 11*c* and 12*c* between the imaginary lines 31 and 32 and imaginary lines 31*c* and 32*c* between the sheet side edges 11 and 12 forms a parallelogram 40*c* having an acute angle α as an interior angle.

Figure 4:
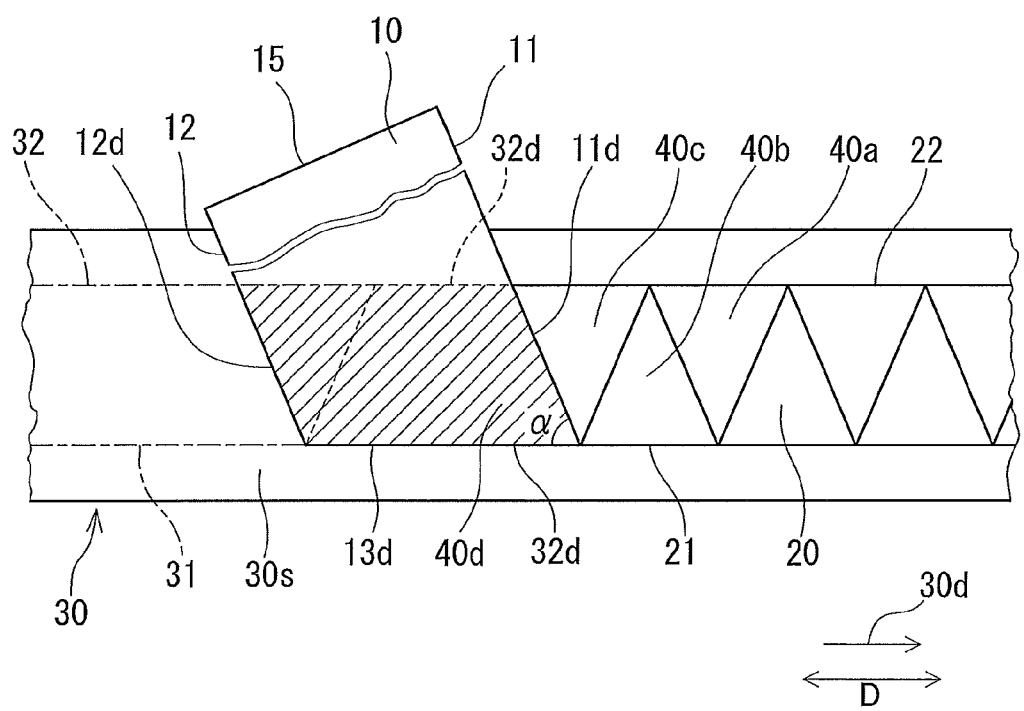
FIG. 4 is a plan view of the strip member showing a step subsequent to the step shown in FIG. 3.

Further subsequently, as shown in FIG. 4, the sheet is folded back along a folding line 13*d* in the same manner as described above, and thus a parallelogram 40*d* defined by four sides, i.e., sheet side edges 11*d* and 12*d* and imaginary lines 31*d* and 32*d* and having an acute angle α a as an interior angle is formed. Then, the folding of the sheet 10 back along the imaginary lines 31 and 32 is repeated in the same manner, and thus the strip member 20 is formed from the sheet 10.

Figure 5:
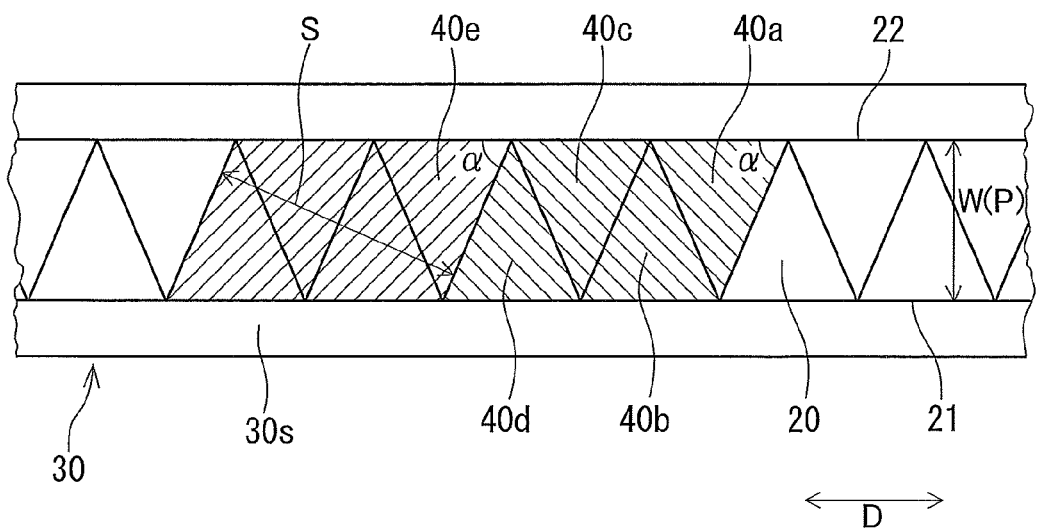
FIG. 5 is a plan view of the strip member obtained by the step (Ia) shown in FIG. 1 to FIG. 4.

FIG. 5 shows the strip member 20 thus formed. In the strip member 20 formed of overlapping layers of the folded sheet 10, a plurality of identical parallelograms 40*a*, 40*b*, 40*c*, 40*d*, 40*e* . . . are arranged in the longitudinal direction D. Each of the parallelograms is defined by four sides, i.e., the side edges of the sheet and the side edges 21 and 22 of the strip member, and includes four triangles adjacent to each other, as shown in the figure. In FIG. 5, only two parallelograms 40*a* and 40*e* are hatched for convenience of illustration. Each of the parallelograms, for example, the parallelogram 40*b* overlaps at least the previous parallelogram 40*a* and the next parallelogram 40*c* in the longitudinal direction D. The alternately selected parallelograms 40*a*, 40*c*, and 40*e* and the alternately selected parallelograms 40*b* and 40*d* can be superimposed on one another by their parallel translation in the longitudinal direction D. The alternately selected parallelograms 40*a*, 40*c*, and 40*e* and the alternately selected parallelograms 40*b* and 40*d* overlap their previous and next ones in the longitudinal direction D, but they may be adjacent to each other in certain sheet folding manners. On the support surface 30*s*, the side edges of the sheet form a pattern of a continuous W shape or a zigzag pattern between the side edges 21 and 22 of the strip member. The side edges 21 and 22 of the strip member 20 form two parallel line segments each extending continuously along the entire length of the strip member 20 in the longitudinal direction D without being divided.

In FIG. 1 to FIG. 4, the forward end edge 15 of the sheet 10 is located outside the imaginary lines 31 and 32 for convenience of illustration, but for actual production, the forward end portion of the sheet including the end edge 15 may be moved back and forth within a range between the imaginary lines 31 and 32. Alternatively, the sheet 10 may be laid down onto the support surface 30*s* while being continuously fed from a roll of the sheet 10 disposed above the support surface 30*s*.

For mass production, it is preferable to feed the sheet 10 onto the support surface 30*s* while moving the support surface 30*s* at a predetermined speed in the longitudinal direction D. In the embodiment shown in the figures, it is recommended to move the support surface 30*s* at a constant speed in a right direction 30*d* in the figures. In this case, a conveyor belt can be used as the support member 30. In this embodiment, the strip member 20 can be produced efficiently by disposing the feeder of the sheet 10 above the support surface 30*s* and feeding the sheet 10 down in its longitudinal direction onto the support surface from the feeder while moving the support surface so that the sheet feeding position thereon is moved back and forth in a direction perpendicular to the longitudinal direction D (in the transverse direction of the strip member).

The folding lines 13*a*, 13*b*, 13*c*, and 13*d* may be formed in contact with the support surface 30*s* as shown in the figures, but they may be formed at positions spaced above the support surface 30*s*. Particularly when the sheet 10 is continuously fed down, it is recommended to lay the sheet 10 down onto the support surface 30*s* while folding the sheet 10 back and forth at positions spaced above the support surface 30*s*. The sheet 10 may be folded on the imaginary lines 31 and 32 or above the imaginary lines 31 and 32, as described above.

In the embodiments shown in FIG. 1 to FIG. 4, the imaginary lines 31 and 32 including the folding lines 13*a*, 13*b*, 13*c*, and 13*d* of the sheet 10 coincide with the side edges 21 and 22 of the strip member 20. However, in the case where the sheet 10 fed down toward the support surface 30*s* is folded back and forth at positions spaced above the support surface 30*s*, the side edges 21 and 22 of the resulting strip member 20 are located slightly outside the imaginary lines 31 and 32, along which the sheet should be folded back, on the support surface 30*s*. Also in the case where the gaps between the overlapping layers of the folded sheet 10 are eliminated by its own weight or by intentional application of pressure, the side edges 21 and 22 of the strip member 20 are displaced slightly outside the imaginary lines 31 and 32. In these cases, the imaginary lines 31 and 32 do not coincide with the side edges 21 and 22 of the strip member 20 but are spaced apart in parallel from the side edges 21 and 22 (W>P), unlike the embodiment (W=P) shown in the figures.

In view of the displacement of the side edges 21 and 22 of the strip member 20 by the elimination of the gaps of the overlapping layers of the folded sheet 10, the width W of the strip member and the acute angle α therein are determined assuming that the strip member composed of the overlapping layers of the folded sheet is a flat member without any gaps between the layers. However, when the gaps are eliminated for this purpose, pressure should be carefully applied perpendicular to the surface of the strip member in order to prevent the sheet itself from being stretched to reduce its thickness.

(Step (Ib))

Figure 6:
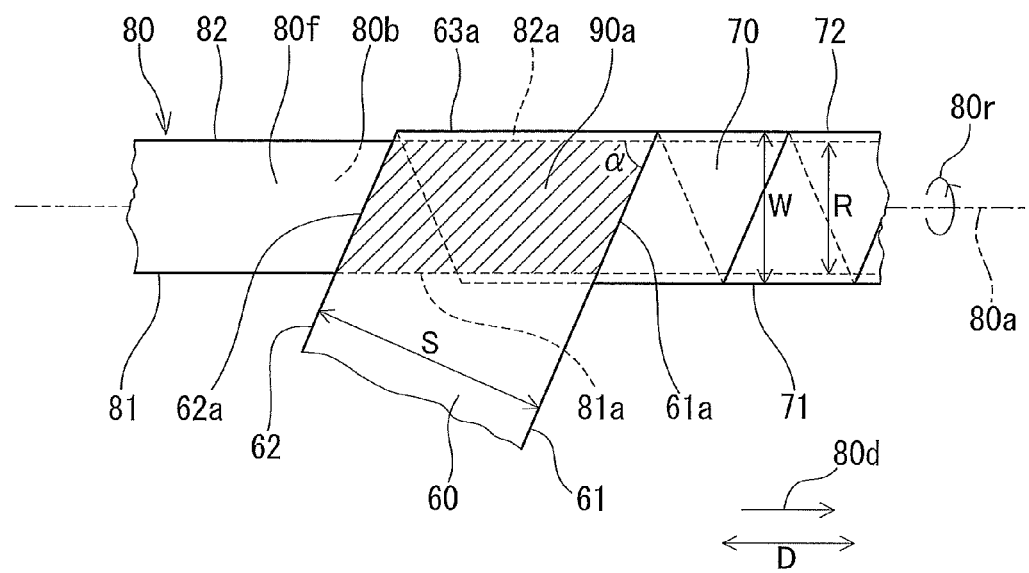
FIG. 6 is a plan view of a strip member showing a step of an embodiment of a step (Ib).
Figure 7:
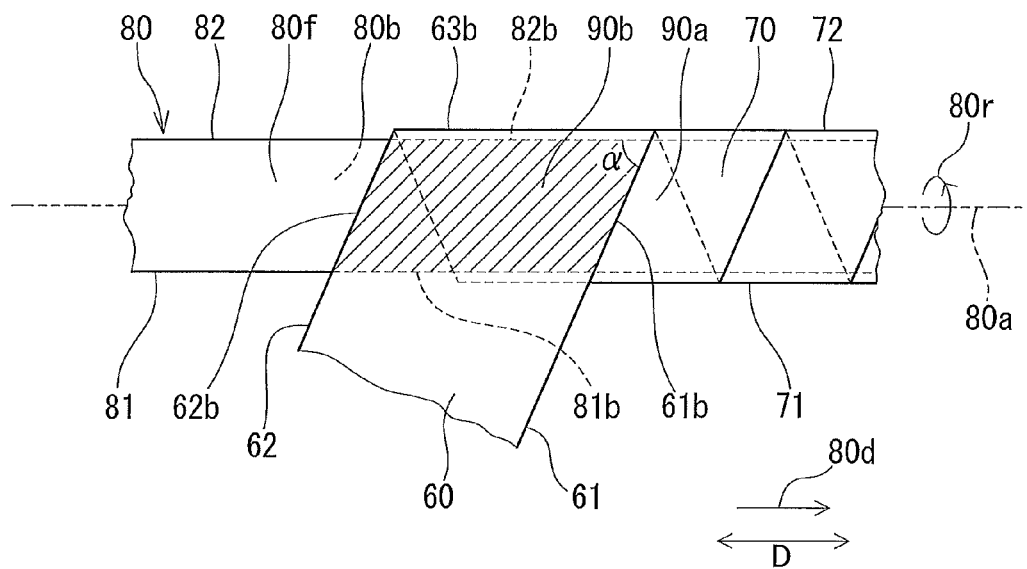
FIG. 7 is a plan view of the strip member showing a step subsequent to the step shown in FIG. 6.
Figure 8:
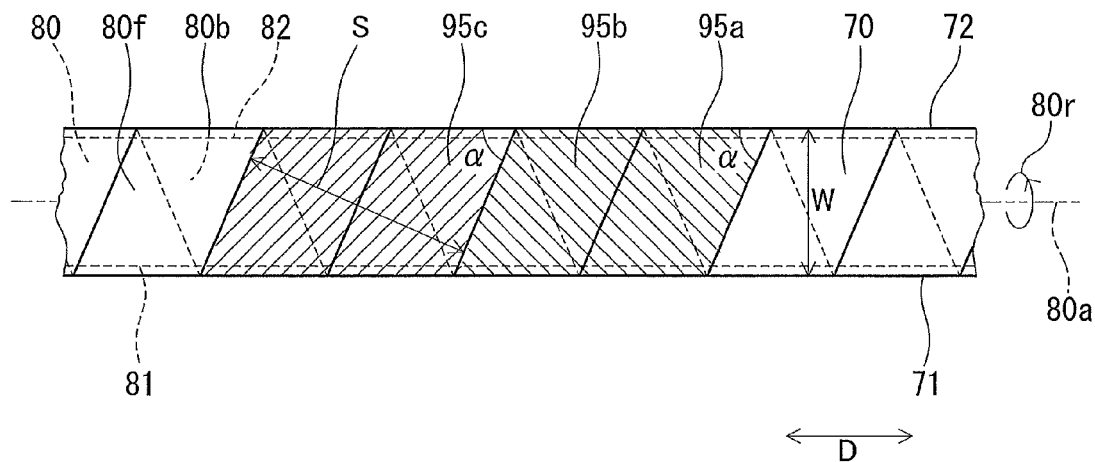
FIG. 8 is a plan view of the strip member obtained by the step (Ib) shown in FIG. 6 and FIG. 7.

An example of the step (Ib) is described with reference to FIG. 6 to FIG. 8. FIG. 6 to FIG. 8 are views of a flat core member 80 on which a sheet 60 is to be wound, as seen in a direction perpendicular to the surface of the core member 80.

The core member 80 is a flat member extending in the longitudinal direction D of a strip member 70 to be formed and has two side edges 81 and 82 extending in parallel in the longitudinal direction D and a front surface 80f and a back surface 80b. A strip sheet 60 is spirally wound around the core member 80 so as to obtain a roll of the sheet 60, and then the core member 80 is removed from the roll. The sheet 60 is wound around the core member 80, which is rotating in a direction indicated by an arrow 80r about its axis 80a extending in the longitudinal direction D so that the front surface 80f and the back surface 80b are repeatedly turned upside down.

The strip sheet 60 having a width S is continuously fed in its longitudinal direction toward the core member 80. The sheet 60 is wound around the core member 80 while being folded along the side edges 81 and 82 of the core member 80 so as to cover the front surface 80f and the back surface 80b of the core member 80 to form the strip member 70. The distance between the side edges 71 and 72 of the resulting strip member 70, i.e., the width W of the strip member has a value obtained by adding twice the thickness of the strip member 70 to the distance R between the side edges 81 and 82 of the core member.

In the state shown in FIG. 6, the sheet 60 has already been folded toward the back surface 80b along the first side edge 81 of the core member 80 and has just been folded toward the front surface 80f along the second side edge 82. The sheet side edges 61 and 62 of a portion of the sheet 60 fed forward from the folding line 63a, in other words, an unfolded portion of the sheet 60 to be subsequently folded, diagonally cross the region between the core member side edges 81 and 82, specifically, to form an acute angle α with the longitudinal direction D. A quadrilateral defined by the sheet side edges 61 and 62 and the core member side edges 81 and 82, more specifically, a quadrilateral (hatched region) defined by four sides, i.e., sheet side edges 61b and 62b between the core member side edges 81 and 82 and core member side edges 81a and 82a between the sheet side edges 61 and 62 forms a parallelogram 90a having an acute angle α as an interior angle.

As the core member 80 rotates about its axis 80a, the sheet 60 is folded toward the back surface 80b of the core member 80 along the first side edge 81 thereof and then folded again toward the front surface 80f of the core member 80 along the second side edge 82 thereof. As shown in FIG. 7, after the sheet is wound in a single turn around the core member 80, the sheet side edges 61 and 62 of a portion of the sheet 60 fed forward from the folding line 63b on the second side edge 82 diagonally cross the region between the core member side edges 81 and 82 to form an acute angle α with the longitudinal direction D of the strip member 70. A quadrilateral defined by four sides, i.e., sheet side edges 61b and 62b between the core member side edges 81 and 82 and core member side edges 81b and 82b between the sheet side edges 61 and 62 forms a parallelogram 90b having an acute angle α as an interior angle. Then, the folding of the sheet 60 is repeated along the side edges 81 and 82 of the core member 80 alternately, and thus the sheet 60 is spirally wound around the core member 80 to form the strip member 70.

FIG. 8 shows the strip member 70 thus formed. In the strip member 70, a plurality of identical parallelograms 95a, 95b, 95c . . . each defined by four sides, i.e., the side edges of the sheet and the side edges 71 and 72 of the strip member 70, are arranged in the longitudinal direction D. The parallelograms 95a, 95b, 95c . . . are slightly larger than parallelograms 90a, 90b, 90c . . . each defined by four sides, i.e., the side edges of the sheet and the side edges 81 and 82 of the core member 80. In FIG. 8, only two parallelograms 95a and 95c are hatched for convenience of illustration. Each of the parallelograms, for example, the parallelogram 95b overlaps at least the previous parallelogram 95a and the next parallelogram 95c in the longitudinal direction D. The parallelograms 95a, 95b, 95c . . . can be superimposed on one another by their parallel translation in the longitudinal direction D. Also on the back surface 80b of the core member 80, a plurality of parallelograms of the strip member 70, like the parallelograms 95a, 95b, 95c . . . , are formed. In the strip member 70 shown in the figure, the side edges of the sheet form a pattern of two parallel spaced lines. The side edges 71 and 72 of the strip member 70 form two parallel line segments each extending continuously in the longitudinal direction D without being divided.

After the sheet 60 is spirally wound around the core member 80 so as to obtain a roll of the sheet 60, the core member 80 is removed therefrom. The removal of the core member 80 can be performed by pulling the core member 80 out from the roll of the sheet 60 in the longitudinal direction D. However, the removal of the core member 80 may be performed by preparing the core member 80 made of a material that decomposes at a temperature at which the fluororesin does not decompose and heating the core member 80 up to the temperature at which the fluororesin does not decompose but the material decomposes. Alternatively, the removal of the core member 80 may be performed by preparing the core member 80 made of a material that dissolves in a solvent in which the fluororesin and the filler do not dissolve and by bringing the core member 80 into contact with the solvent.

For mass production, it is preferable to feed the sheet 60 onto the core member 80 rotating about its own axis while moving the core member 80 at a predetermined speed in the longitudinal direction D. In the embodiment shown in the figures, it is recommended to move the core member 80 at a constant speed in a right direction 80d in the figures. In this embodiment, the strip member 70 can be produced efficiently by disposing the feeder of the sheet 60 at a position spaced apart from the core member 80 and feeding the sheet 60 in such a manner that the longitudinal direction of the sheet 60 and the longitudinal direction D of the strip member 70 form an acute angle α therebetween.

Strictly speaking, also in the strip member shown in FIG. 8, the values of the width W and the acute angle α are determined assuming that the strip member composed of the overlapping layers of the folded sheet has no gap between the layers. Depending on the thickness of the core member 80, the sheet 60 wound around the core member 80 may be deformed and flattened after the core member 80 is removed and the width W and the acute angle α may have different values from the values before the removal of the core member 80.

The shape of the core member 80 is not limited to a flat shape. The core member 80 may be a cylindrical member such as a prismatic member having a regular polygonal base or a circular cylindrical member. When a circular cylindrical core member is used, the strip member can be formed not by folding the sheet but by bending the sheet.

(Width S of Sheet, Width W of Strip Member, Acute Angle α, and Their Relationship)

A preferred relationship among the width S of the sheet, the width W of the strip member, and the acute angle α is described with reference to FIG. 5 and FIG. 8.

In FIG. 5, the strip member 20 is formed of four overlapping layers of the sheet. Also in FIG. 8, the strip member 70 is formed of four overlapping layers of the sheet after the core member 80 is removed and the layers on the front surface 80*f* and the layers on the back surface 80*b* are joined together. In the strip member 20 or 70, except in the end portion in the longitudinal direction D where the folding or winding is started or ended, the number of overlapping layers of the sheet is kept constant, and thus the thickness of the strip member is kept almost constant. In other words, in the strip member 20 or 70, as seen in a direction perpendicular to its principal surface, the sheet 10 or 60 is laid in such a manner that the sheet side edges 11 and 12 or 61 and 62 are brought to coincide with those that have already been formed by the previous folding of the sheet, and thus parallelograms 40*a* and 40*e* or 95*a* and 95*c* are formed so that they are adjacent to each other but do not overlap each other. Strictly speaking, this advantageous feature is achieved when the width S of the sheet, the width W of the strip member, and the acute angle α satisfy the following relation (1):

$$\alpha = \cos^{-1}(S/2nW) \quad (1),$$

where n is a natural number.

Due to uncontrollable factors unavoidable in the actual mass production, it is difficult to continue the production for a long time while completely satisfying the relation (1). In addition, a slight local change in the thickness of the strip member, specifically a local change in the thickness due to slight overlapping or slight separation of the layers of the sheet can be reduced by the rolling performed in the step (II). In view of these, it is, in fact, appropriate to perform the step (I) by controlling the acute angle α within the range defined by the following relation (2):

$$\cos^{-1}(S/2nW) - y1 < \alpha < \cos^{-1}(S/2nW) + y2 \quad (2)$$

y1 and y2 are 2°, for example, but preferably less than 2°. y1 and y2 are each independently preferably 1°, more preferably 0.5°, and particularly preferably 0.3°. The upper limit of n is not particularly limited, but n is preferably 10 or less.

However, if α is too small compared to $\cos^{-1}(S/2nW)$ particularly when n is 1, a divided portion (a portion where the sheet is not placed) on the side edges of the strip member may remain uneliminated even after the rolling. In order to prevent this, it is recommended to set y1 to a small value (for example, 1° or less). Generally, it is preferable to form the strip member by bending the sheet in such a manner that the side edges of the strip member form two parallel line segments each extending continuously along the entire length of the strip member in the longitudinal direction D without being divided.

The number of overlapping layers m of the sheet in the strip member can be represented by the following relation (3) using the natural number n in the relations (1) and (2). The number of overlapping layers m in the strip member 20 or 70 is 4. In the case of the strip member 70, the number of overlapping layers m is the number of layers obtained after the core member 80 is removed.

$$m = 2n \quad (3)$$

The number of overlapping layers m of the sheet is a natural number of 2 or more, specifically a multiple of 2. However, when m is too large, the production efficiency decreases. In view of this, m is, for example, 20 or less, further 10 or less, particularly 8 or less, and it may be 6 or less in some cases. On the other hand, in order to achieve high strength of the fluororesin sheet, it is recommended to form the strip member of at least several (e.g., m=4 or more) layers of the sheet. The natural number n can be determined by back-calculation from the appropriate number of layers, and n is, for example, 1 to 10, and further 2 to 5.

Figure 9:
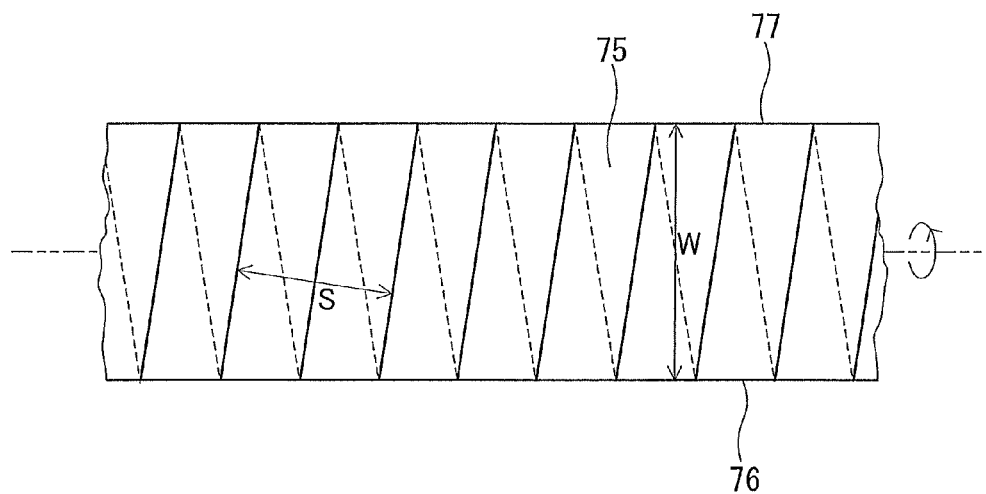
FIG. 9 is a plan view of a strip member obtained by another embodiment of the step (Ib).

It is usually difficult to obtain a sheet strip having a sufficiently greater width than the width S of the sheet only by rolling a strip sheet obtained by extrusion molding or the like in its longitudinal direction, because the width of the resulting sheet strip is limited by the width S of the sheet. However, in the step (I), the width W of the strip member need not be equal to the width S of the sheet and may be smaller or greater than the width S. Therefore, it is also possible to produce the strip member having a greater width W without any limitation by the width S of the strip sheet. For example, a strip member 75 having a greater width W, which is the distance between the side edges 76 and 77, than the width S of the sheet, as shown in FIG. 9, can be obtained by the same step (Ib) as the step described with reference to FIG. 6 and FIG. 7. The step (Ia) also makes it possible to produce a strip member having a much greater width W than the width S of the sheet. In the step (I), it is also possible to form the strip member by the sheet so that the width W of the resulting strip member is at least 1.5 times, preferably at least 1.8 times, more preferably at least 2 times, and particularly preferably at least 3 times, the width S of the sheet.

The acute angle α of the parallelogram may be selected as appropriate from the range of angles of less than 90° depending on the strip member to be formed. The acute angle α is preferably, for example, 10° or more, more preferably 45° or more, particularly preferably 50° or more, and more particularly preferably 65° or more, and it may be 70° or more in some cases. The acute angle α is preferably 87° or less, and particularly preferably 85° or less, and it may be 80° or less in some cases. In the sheet strip obtained by selecting the appropriate acute angle α, for example, 65° to 85°, the difference between the longitudinal strength and the transverse strength can be reliably reduced.

In the actual mass production process, for example, the parallelograms of the strip member may be slightly deformed due to lack of straightness of the side edges of the sheet. However, the object of the present invention can be achieved even if the parallelism of the sides of the parallelograms are slightly reduced. In this description, the term "parallelogram" is not limited to a parallelogram in a strict sense, and it includes a so-called approximate parallelogram, more specifically, a quadrilateral shape with four sides, assumed to be straight lines based on an ideal design parallelogram, in which the deviation in the distance between the opposite sides from the design distance is 20% or less, preferably 15% or less, and more preferably 10% or less.

The embodiment in which the width of the strip member is kept constant is shown above, but the strip member may include portions with different widths. Such a strip member can be formed, for example, by changing the amplitude of the transverse movement of the sheet feeder for feeding the sheet to be folded or by using a flat core member composed of two flat plates with different widths. The width W of the strip member is not particularly limited, and the appropriate width W is, for example, in a range of 1 to 100 cm, particularly in a range of 5 to 80 cm. The width S of the sheet also is, for example, in a range of 1 to 100 cm, particularly in a range of 5 to 80 cm.

[Step (II)]

The step (II) is a step of producing an elongated sheet strip by rolling the strip member obtained in the step (I) in its longitudinal direction D. The strip member is elongated in its longitudinal direction D by rolling, and thus a sheet strip having a predetermined thickness is obtained. Rolling is superior to compression using a batch-type press in terms of production efficiency of elongated sheet strips and thus more suitable for production of long elongated sheet strips.

The rolling method is not particularly limited to a specific method. Any known rolling method such as rolling using a pair of rolls (two rolls) and rolling using spreader rolls can be used. Each strip member may be subjected to rolling, or a stack of two or more strip members may be subjected to rolling. The strip member(s) may be subjected to rolling twice or more. In order to obtain an elongated sheet strip with a controlled thickness to a predetermined value, in particular a thin elongated sheet strip, it is sometimes desirable to subject the strip member(s) to rolling more than once.

[Repetition of Step (I) and Step (II)]

The elongated sheet strip obtained in the step (I) and the step (II) may further be subjected to the following steps (III) and (IV), which are performed in the same manner as the steps (I) and (II).

The step (III) is a step of forming a second strip member from a second strip sheet as the elongated sheet strip. In the step (III), the second strip member is formed by bending the second strip sheet in such a manner that quadrilaterals formed on a surface of the second strip member, each defined by two second strip member side edges extending in the longitudinal direction of the second strip member and two second strip sheet side edges of the second strip sheet that crosses a region between the two second strip member side edges are second parallelograms each having an acute angle $\beta$ and that the second parallelograms are arranged in the longitudinal direction of the second strip member.

The step (IV) is a step of forming a second elongated sheet strip by rolling the second strip member in the longitudinal direction of the second strip member.

The step (III) and the step (IV) are performed in the same manner as the step (I) and the step (II) except that the sheet and the strip member are replaced by the second strip sheet and the second elongated strip member respectively. Specific embodiments of the step (III) and the step (IV) and their preferred conditions are as described above for the step (I) and the step (II) respectively, and therefore the description thereof is not repeated here. The conditions for the step (III) and the step (IV), for example, the width of the second strip member and the acute angle can be determined independently of the above-mentioned width W and the angle $\alpha$ respectively. After the step (III) and the step (IV) are performed, a step (V) and a step (VI), which are the same as the step (I) and the step (II), may further be performed using the second elongated sheet strip obtained in the step (III) and the step (IV) as a third strip sheet.

As described above, formation of layers by folding the strip sheet (Step (I)) and rolling (Step (II)) can be repeated as many times as needed. It is possible to obtain a higher strength filler-containing fluororesin sheet by repeating these steps.

[Removal of Forming Aid]

After the step (II) is performed, the forming aid is removed from the resulting sheet strip, as needed. However, when the formation of layers by folding the sheet (Step (I)) and the rolling (Step (II)) are repeated, it is recommended to remove the forming aid after the repetition of these steps is completed. Therefore, for example, when the step (III) and the step (IV) described above are performed, it is preferable to remove the forming aid from the second elongated sheet strip after the step (IV) is performed.

The removal of the forming aid can be performed by any known method depending on the type of the forming aid used. The forming aid is usually removed by heating the sheet strip to the evaporation temperature of the forming aid.

[Other Steps]

Before or after the forming aid is removed, further pressure may be applied to the elongated sheet strip, as needed, to reduce its porosity. This application of pressure is suitable for increasing the effect of the filler in enhancing the properties of the sheet strip as its porosity is reduced. The porosity is not particularly limited, but, for example, it may be 0 to 40 vol. %, or even 5 to 40 vol. %. This application of pressure may be accompanied by heating.

The sheet strip may be sintered by heating. Sintering can also be performed while the forming aid is removed and/or the pressure forming is performed. The temperature of sintering PTFE is preferably 350 to 400° C., particularly 370 to 390° C. It is recommended to perform the pressure forming of the sheet strip containing PTFE while heating the sheet strip at a temperature in this range.

The sheet strip can be produced, for example, in the form of a long strip with a length of 2.5 m or more, further 4 m or more, and even 10 m or more in some cases. A step of winding such a long sheet strip around a core may further be performed so as to store the sheet strip in the form of a roll for shipment.

[Preparation of Sheet to be Layered]

The strip sheet to be overlapped and layered in the step (I) can be formed by a conventionally known method such as extrusion molding or calender molding. In the extrusion molding, a mixture as a material of the sheet is extruded in the longitudinal direction of the sheet to be formed. In the calender molding, a mixture as a material of the sheet is rolled between rolls in the longitudinal direction of the sheet to be formed. That is, a step (Pa) may be performed prior to the step (I). In the step (Pa), a mixture containing the fluororesin, the filler, and the forming aid is formed into a sheet by extruding or rolling the mixture in the longitudinal direction of the sheet to be formed.

The sheet to be layered may previously rolled to adjust the thickness of the sheet to an appropriate range. That is, a step (Pb) may be performed prior to the step (I). In the step (Pb), the sheet is rolled in the longitudinal direction of the sheet.

The step (Pa) and/or the step (Pb) to be performed prior to the step (I) can be performed by a known method. In particular, it is useful to perform the step (Pb) in order to maintain the strength of the sheet to be layered and rolled.

When PTFE is used as the fluororesin, it is recommended to prepare the mixture as a material of the sheet by preparing a mixture of PTFE and the filler first and then adding the forming aid to the resulting mixture. More specifically, an aggregating agent is added to a dispersion liquid containing PTFE and the filler dispersed therein, and then the forming aid is added to the aggregated mixture of PTFE and the filler. Thus, a pasty mixture can be obtained. In this case, a PTFE dispersion is suitable as the material of PTFE.

EXAMPLES

<Measurement of Tensile Strength>

A test sample (with a width of 10 mm and a length of 50 mm) was stretched at a rate of 100 mm/min in its longitudinal direction until the sample was broken, using a tensile tester "Tensilon" (manufactured by Orientec Corporation). The measurement was performed at room temperature, and the distance between chucks was 20 mm. The tensile strength is calculated by the following equation:

Tensile strength (N/mm$^2$)=Stress at break (N)/Sample's cross-sectional area (mm$^2$), where Sample's cross-sectional area (mm$^2$)=Sample's thickness (mm)×Sample's width (mm).

The elongated sheet strip as a test sample used for the tensile test was prepared so that it could be stretched in its longitudinal direction, its transverse direction (perpendicular to the longitudinal direction), a direction forming 45° with the longitudinal and transverse directions (45° direction), and a direction forming 135° with the longitudinal and transverse directions (135° direction), respectively. The tensile strength was measured three times, and the average value of the three measurements was used.

(Example 1)

Carbon black (CB) particles (as a filler, "Toka Black (registered trademark) #4500", with an average particle diameter of 40 nm, manufactured by Tokai Carbon Co., Ltd.) were dispersed in water, and a PTFE dispersion ("Fluon (registered trademark) AD938E", with a PTFE content of 60 wt. %, manufactured by Asahi Glass Co., Ltd.) was added to the CB dispersion to obtain a mixture containing PTFE and CB at a weight ratio of 50:50. PTFE and CB in the mixture were coaggregated to form a coaggregate, which was then heated and dried to obtain a PTFE-CB particle mixture. "Isopar (registered trademark) M" (manufactured by Exxon Mobil Corporation) as a forming aid was added to the dried PTFE-CB particle mixture. Thus, a pasty mixture containing 47 wt. % of the forming aid per 100 wt. % of the PTFE-CB particle mixture was obtained.

Next, the pasty mixture was formed into pellets using a preforming machine. These pellets were fed into an extruder (at an extrusion speed of 60 mm/min. and a cylinder temperature of 40° C.) for extrusion molding to obtain an extruded sheet with a width of 45 mm. This extruded sheet was rolled between two rolls. Thus, a strip sheet with a thickness of 1.2 mm and a width of 50 mm was obtained.

The strip sheet (with a width S of 50 mm) thus obtained was used to produce a strip member by the method described with reference to FIG. 1 to FIG. 3. The acute angle α of the parallelograms was 60°, and the width W of the strip member was 50 mm. The strip member thus obtained was rolled in its longitudinal direction between two rolls. Thus, a sheet strip with a thickness of 0.7 mm and a width of 64.5 mm was obtained. The longitudinal length of the sheet strip was 22 m.

(Example 2)

A sheet strip with a thickness of 114 mm and a width of 110 mm was produced in the same manner as in Example 1, except that the acute angle α was 75.5° and the width of the strip member was 100 mm. The longitudinal length of the sheet strip was 8 m.

(Example 3)

A sheet strip with a thickness of 1.22 mm and a width of 198 mm was produced in the same manner as in Example 1, except that the acute angle α was 82.8° and the width of the strip member was 200 mm. The longitudinal length of the sheet strip thus obtained was 4 m.

Table 1 shows the measurement results of the tensile strength.

TABLE 1

| | Acute angle α (°) | Tensile strength (MPa) | | | |
|---|---|---|---|---|---|
| | | Longitudinal direction | Transverse direction | 45° direction | 135° direction |
| Example 1 | 60 | 1.05 | 0.60 | 0.73 | 0.66 |
| Example 2 | 75.5 | 0.83 | 0.77 | 0.68 | 0.69 |
| Example 3 | 82.8 | 0.56 | 0.69 | 0.63 | 0.58 |

In Examples 1 to 3, sheet strips with low directional dependence of strength were obtained. Particularly in Examples 2 and 3, in which the acute angles a were relatively large, the directional difference in the tensile strength was sufficiently reduced.

In Examples 1 to 3, the acute angles a were within a range of 0.1° above or below $\cos^{-1}(S/2nW)$. Therefore, the resulting strip members and sheet strips had high thickness uniformity. In each of Examples 1 to 3, n was 1 (the number of sheet layers m=2). However, n may be 2 or more, as described above. For example, in Example 2, n=2 (m=4) was obtained if the width W of the strip member was not changed to 100 mm but kept unchanged at 50 mm.

In each of Examples 2 and 3, the width W of the strip member was at least about twice the width S of the sheet, and the width of the resulting sheet strip was also at least twice the width S of the sheet. This means that a long sheet strip with a width suitable for its intended use can be obtained without changing an extruder die. This is advantageous for mass production of fluororesin sheets.

The invention claimed is:

1. A method for producing a filler-containing fluororesin sheet, comprising:
   a step (I) of forming a strip member from a strip sheet containing a fluororesin, a filler, and a forming aid; and
   a step (II) of forming an elongated sheet strip by rolling the strip member in a longitudinal direction of the strip member, wherein
   in the step (I), the strip member is formed by bending the strip sheet in such a manner that quadrilaterals formed on a surface of the strip member, each defined by two strip member side edges extending in the longitudinal direction of the strip member and two strip sheet side edges of the strip sheet that crosses a region between the two strip member side edges are parallelograms each having an acute angle α as an interior angle and that the parallelograms are arranged in the longitudinal direction of the strip member.

2. The method for producing a filler-containing fluororesin sheet according to claim 1, wherein the acute angle α is 45° or more and less than 90°.

3. The method for producing a filler-containing fluororesin sheet according to claim 2, wherein the acute angle α is in a range of 65° to 85°.

4. The method for producing a filler-containing fluororesin sheet according to claim 1, wherein in the step (I), the strip member is formed by bending the strip sheet in such a manner that the strip member side edges form two parallel line segments each extending continuously along an entire length of the strip member in the longitudinal direction D without being divided.

5. The method for producing a filler-containing fluororesin sheet according to claim 1, wherein in the step (I), the strip member is formed so that a width W of the strip member is at least 1.5 times a width S of the strip sheet.

6. The method for producing a filler-containing fluororesin sheet according to claim 1, wherein the acute angle α is an angle satisfying the following relation:

$$\cos^{-1}(S/2nW)-2°<\alpha<\cos^{-1}(S/2nW)+2°$$

, where S is a width of the strip sheet, W is a width of the strip member, and n is a natural number of 10 or less.

7. The method for producing a filler-containing fluororesin sheet according to claim 1, wherein the step (I) is a step (Ia) comprising: a step (Ia1) of folding the strip sheet back along a first imaginary line toward a second imaginary line, the first imaginary line and the second imaginary line extending in parallel on a support surface in a longitudinal direction D of the strip member to be formed, the strip sheet being placed on the support surface so that, as seen in a direction perpendicular to the support surface, the strip sheet side edges diagonally cross a region between the first imaginary line and the second imaginary line, wherein the strip sheet is folded back so that, as seen in the direction perpendicular to the support surface, the strip sheet side edges of an unfolded portion of the strip sheet diagonally cross the region between the first and second imaginary lines; and a step (Ia2) of folding the strip sheet already folded along the first imaginary line back toward the first imaginary line along the second imaginary line so that, as seen in the direction perpendicular to the support surface, the strip sheet side edges of an unfolded portion of the strip sheet diagonally cross the region between the first and second imaginary lines, the step (Ia1) and the step (Ia2) being repeated alternately so as to form the strip member on the support surface, or the step (I) is a step (Ib) comprising: a step (Ib1) of spirally winding the strip sheet around a core member extending in the longitudinal direction D of the strip member to be formed so as to obtain a roll of the strip sheet; and a step (Ib2) of removing the core member from the roll so as to obtain the strip member.

8. The method for producing a filler-containing fluororesin sheet according to claim 1, further comprising, prior to the step (I)

a step (Pa) of forming a mixture containing the fluororesin, the filler, and the forming aid into the strip sheet by extruding or rolling the mixture in a longitudinal direction of the strip sheet to be formed; and/or a step (Pb) of rolling the strip sheet in the longitudinal direction of the strip sheet.

9. The method for producing a filler-containing fluororesin sheet according to claim 1, further comprising a step of removing the forming aid from the elongated sheet strip.

10. The method for producing a filler-containing fluororesin sheet according to claim 1, further comprising:

a step (III) of forming a second strip member from a second strip sheet as the elongated sheet strip; and a step (IV) of forming a second elongated sheet strip by rolling the second strip member in a longitudinal direction of the second strip member, wherein in the step (III), the second strip member is formed by bending the second strip sheet in such a manner that quadrilaterals formed on a surface of the second strip member, each defined by two second strip member side edges extending in the longitudinal direction of the second strip member and two second strip sheet side edges of the second strip sheet that crosses a region between the two second strip member side edges are second parallelograms each having an acute angle β and that the second parallelograms are arranged in the longitudinal direction of the second strip member.

11. The method for producing a filler-containing fluororesin sheet according to claim 10, further comprising a step of removing the forming aid from the second elongated sheet strip.

12. The method for producing a filler-containing fluororesin sheet according to claim 1, wherein the filler contains at least one selected from the group consisting of carbon black and boron nitride.

13. The method for producing a filler-containing fluororesin sheet according to claim 1, wherein the fluororesin contains polytetrafluoroethylene.

14. The method for producing a filler-containing fluororesin sheet according to claim 1, wherein a ratio of an amount of the filler to a total amount of the fluororesin and the filler is in a range of 40 to 90 wt. %.

* * * * *